United States Patent [19]

Watanabe et al.

[11] Patent Number: 4,948,425

[45] Date of Patent: Aug. 14, 1990

[54] TITANIUM CARBO-NITRIDE AND CHROMIUM CARBIDE-BASED CERAMICS CONTAINING METALS

[75] Inventors: Tadahiko Watanabe; Tsuyoshi Doutsu, both of Tosu; Osamu Yagishita, Oomuta; Hideki Yamamoto, Oomuta; Yukio Kai, Oomuta, all of Japan

[73] Assignee: Agency of Industrial Science and Technology, Tokyo, Japan

[21] Appl. No.: 334,219

[22] Filed: Apr. 6, 1989

[30] Foreign Application Priority Data

Apr. 9, 1988 [JP] Japan .................................. 63-87778

[51] Int. Cl.$^5$ ............................................. C22C 29/04
[52] U.S. Cl. ....................................... 75/238; 75/240; 75/244; 75/242
[58] Field of Search .................. 75/238, 240, 244, 242

[56] References Cited

U.S. PATENT DOCUMENTS

| | | | |
|---|---|---|---|
| 4,514,224 | 4/1985 | Nishigaki | 75/238 |
| 4,769,070 | 9/1988 | Tobioka et al. | 75/238 |
| 4,788,166 | 11/1988 | Araki et al. | 501/96 |

Primary Examiner—Stephen J. Lechert, Jr.
Assistant Examiner—Leon Nigohosian, Jr.
Attorney, Agent, or Firm—Oblon, Spivak, McClelland, Maier & Neustadt

[57] ABSTRACT

New ceramics have excellent mechanical properties such as high density, strength, hardness and toughness. The new ceramics are prepared by sintering a mixture prepared by adding 1 to 90 percent by weight of chromium carbide to titanium carbo-nitride together with some elements selected from the group of transition metals of groups IV, V, VI and VII, ferrous metals and semi-metals. For some types of new ceramics, boron carbide is added, too.

7 Claims, No Drawings

TITANIUM CARBO-NITRIDE AND CHROMIUM CARBIDE-BASED CERAMICS CONTAINING METALS

FIELD OF THE INVENTION

This invention relates to new types of ceramics and cermets having excellent mechanical properties including high density, high strength, high hardness and high toughness suited for use in many applications including cutting tools and machine parts requiring high heat and wear resistance.

DESCRIPTION OF THE PRIOR ART

Refractory hard metals, cermets, plus the titanium carbo-nitride and metal boride-based ceramics (Japanese Patent No. 1243609) and titanium carbo-nitride-based ceramics (Japanese Provisional Patent Publication No. 270943 of 1984) proposed by the inventors are among the materials intended for use in the above applications.

Refractory hard metals and cermets have been extensively used in the manufacture of cutting tools, and there is strong demand for the development of new products having higher performance. The titanium carbo-nitride and metal boride-based ceramics and titanium carbo-nitride-based ceramics proposed by the inventors are better than refractory hard metals and cermets in heat, corrosion and wear resistance. The present invention is based on the titanium carbo-nitride-based ceramics according to our previous invention. Titanium carbo-nitride and chromium carbide-based ceramics disclosed therein have proved to have higher wear resistance than the titanium carbo-nitride and metal boride-based ceramics mentioned before. The titanium carbo-nitride and chromium carbide-based ceramics are expected to find increasing use as cutting tools for finishing operations because of their long tool life and their excellent ability to cut steels, especially carbon steels. If their mechanical properties, such as toughness, strength and hardness, are improved, their use, which has so far been limited to finishing operations will be expanded to intermediate machining operations and many other applications where high wear resistance is required.

SUMMARY OF THE INVENTION

The object of this invention is to provide ceramics satisfying such needs and suited for use as cutting tools and in many other applications demanding high wear resistance.

To improve the properties of the titanium carbo-nitride and chromium carbide-based ceramics, the inventors made studies on the effect of various additives. Those studies resulted in the finding that addition of transition metals, ferrous metals and some of semi-metals of groups IV, V, VI and VII produces remarkable results. It was also found that addition of boron carbide together with those metals produces similar or even better results. The present invention is based on these findings.

A first group of titanium carbo-nitride and chromium carbide-based ceramics according to this invention are prepared by sintering a mixed powder consisting of a basic component A, which is a mixture of a powder of at least one titanium carbo-nitride selected from the group of titanium carbo-nitrides containing various ratios of carbon and a powder of chromium carbide accounting for 1 to 90 percent by weight of the whole mixture, and one or more elements selected from the group of transition metals, i.e., titanium, zirconium, hafnium, vanadium, niobium, tantalum, chromium, molybdenum, tungsten and manganese, ferrous metals, i.e., iron, cobalt and nickel, and a semi-metal, i.e., silicon, of groups IV, V, VI and VII accounting for 0.05 to 40 percent by weight of the whole mixture.

A second group of titanium carbo-nitride and chromium carbide-based ceramics according to this invention are prepared by sintering a mixed powder consisting of the same basic component A, one or more elements selected from the group of transition metals, i.e., titanium, zirconium, hafnium, vanadium, niobium, tantalum, chromium, molybdenum, tungsten and manganese, of groups IV, V, VI and VII, ferrous metals, i.e., iron, cobalt and nickel, and a semi-metal, i.e., silicon, accounting for 0.05 to 40 percent by weight of the whole mixture, and boron carbide that represents 0.1 to 5 percent by weight of the whole mixture.

A suitable ratio of carbon to nitrogen ($\alpha:\beta$) in titanium carbo-nitride, which is the chief ingredient used in this invention, is between 10:90 and 90:10. The powder of titanium carbo-nitride should have an average grain size of 2 $\mu$m and under, or preferably of 1$\mu$ and under.

One or more chromium carbides, accounting for 1 to 90 percent by weight of the whole mixture and selected from the group of $Cr_3C_2$, $Cr_{23}C_6$ and $Cr_7C_3$, are added. The chromium carbides should have an average grain size of 2 $\mu$m and under, or preferably of 1 $\mu$m and under. The wear resistance of the titanium carbo-nitride and chromium carbide-based ceramics is due to the presence of chromium. When oxidized by the heat of friction, particles of chromium existing in the chromium carbide phase or as (Ti, Cr) (CN) produce chromic oxide ($Cr_2O_3$). This oxide serves to reduce the coefficient of friction, thereby suppressing the generation of frictional heat. This mechanism seems to explain the high wear resistance of the ceramics being discussed. As to the behavior of mechanical properties that appears when the mixing ratio of titanium carbo-nitride and chromium carbide is changed, it has been empirically confirmed that very high Vickers hardness is obtained when chromium carbonate accounts for 1 to 90 percent by weight of the whole mixture.

Said addition of 0.05 to 40 percent by weight of metal powder remarkably improves properties by accelerating the formation of a closely packed crystal structure. The amount of addition is limited to between 0.05 and 40 percent by weight because addition produces little effect under 0.05 percent by weight and, on the other hand, does not produce the desired closely packed crystal structure while bringing about a remarkable lowering of strength and hardness above 40 percent by weight. Addition of boron carbide should be held between 0.1 and 5 percent by weight. The effect of addition starts to show when the percentage by weight exceeds 0.1. Beyond 5 percent by weight, however, the mixture becomes difficult to sinter and compact. Addition of boron carbide increases hardness through said compacting and the production of chromium boride ($CrB_2$).

To improve the mechanical properties of titanium carbo-nitride and chromium carbide-based ceramics, it is necessary to strengthen grains of titanium carbo-nitride and chromium carbide and grain boundaries. Formation of solid solutions is one of the particularly effective grain strengthening methods. The desired solid solution can be obtained by substituting part of metal atoms (titanium and chromium) in titanium carbonitride and chromium carbide with atoms of other metals. The formation of solid solutions, which is basically limited by the size of metal atoms, is possible among transition metals.

The ceramics according to this invention can be made by the same processes as those employed in the making of known ceramics.

One of such processes, for example, comprises filling a mixed powder of materials in a metal mold, cold-pressing the powder under a pressure of 0.5 to 10 t/cm$^2$, further compressing the powder in a rubber press under a pressure of 0.5 to 10 t/cm$^2$, and sintering the compressed piece in a vacuum or a neutral or reductive atmosphere, such as argon gas, at a temperature of 1300° to 1900° C. for a period of 30 to 300 minutes.

Another process is known as hot pressing in which a mixed powder of materials filled in a mold of, for example, graphite is sintered in a vacuum or a neutral or reductive atmosphere, such as argon gas, under a die pressure of 50 to 300 kg/cm$^2$, at a temperature of 1200° to 1700° C. for a period of 10 to 200 minutes.

Hot isostatic pressing (HIP) is also applicable.

EXAMPLE 1

The specimens shown in Table 1 were prepared by thoroughly mixing a powder of TiC$_{0.5}$N$_{0.5}$ with various percentages of Cr$_3$C$_2$, Ti, Zr, Cr, Mo, Co, Ni and Si. The mixtures were made into compressed pieces by means of metal-mold and rubber-press forming. The compressed pieces were sintered in a vacuum at 1650° C. for 90 minutes. Table 1 shows the bending strength, Vickers hardness and fracture toughness of the obtained sintered ceramics.

The asterisked specimens Nos. 1 and 34 in Table 1 are the conventional ceramics included for comparison with the improved ceramics according to this invention.

As is obvious from Table 1, more compact ceramics with improved mechanical properties were obtained by adding powders of said metals to the same basic materials as those in the specimens Nos. 1 and 34.

EXAMPLE 2

Table 2 shows the specimens prepared by adding powders of Cr$_3$C$_2$, Ni and boron carbide (B$_4$C) to a powder of TiC$_{0.5}$N$_{0.5}$.

The thoroughly blended mixtures in Table 2 were made into compressed pieces by means of metal-mold and rubber-press forming. The compressed pieces were sintered in an atmosphere of argon gas at 1400° C. for 90 minutes. Table 2 shows the deflective strength, Vickers hardness and fracture toughness of the obtained sintered ceramics.

As is obvious from the data of the specimens Nos. 4, 5 and 6, addition of boron carbide (B$_4$C) brought about further improvements in mechanical properties.

The effects produced by the addition of the metals described in Examples 1 and 2 are related to the arrangement of electrons in them. Therefore, analogous effects will be obtained even if the metals used are replaced with other metals of the same groups.

TABLE 1

| Specimen No. | Chemical Composition (% by weight) | *1 | *2 | *3 | Porosity |
|---|---|---|---|---|---|
| 1* | 5Cr$_3$C$_2$ — The rest: TiCN | 45 | 1800 | 2.4 | Some |
| 2 | 5Cr$_3$C$_2$ — 0.5Ti — The rest: TiCN | 60 | 1900 | 2.5 | None |
| 3 | 5Cr$_3$C$_2$ — 1.0Ti — The rest: TiCN | 60 | 1900 | 2.5 | None |
| 4 | 5Cr$_3$C$_2$ — 2.0Ti — The rest: TiCN | 75 | 1850 | 2.5 | None |
| 5 | 5Cr$_3$C$_2$ — 5.0Ti — The rest: TiCN | 75 | 1800 | 2.7 | Slight |
| 6 | 5Cr$_3$C$_2$ — 0.5Zr — The rest: TiCN | 70 | 1900 | 2.8 | None |
| 7 | 5Cr$_3$C$_2$ — 1.0Zr — The rest: TiCN | 85 | 1900 | 3.1 | None |
| 8 | 5Cr$_3$C$_2$ — 2.0Zr — The rest: TiCN | 70 | 1800 | 2.8 | None |
| 9 | 5Cr$_3$C$_2$ — 5.0Zr — The rest: TiCN | 55 | 1800 | 2.6 | Slight |
| 10 | 5Cr$_3$C$_2$ — 0.5Cr — The rest: TiCN | 90 | 1850 | 2.7 | None |
| 11 | 5Cr$_3$C$_2$ — 1.0Cr — The rest: TiCN | 95 | 1900 | 2.7 | None |
| 12 | 5Cr$_3$C$_2$ — 2.0Cr — The rest: TiCN | 70 | 1950 | 2.5 | None |
| 13 | 5Cr$_3$C$_2$ — 5.0Cr — The rest: TiCN | 70 | 1900 | 2.6 | Slight |
| 14 | 5Cr$_3$C$_2$ — 10.0Cr — The rest: TiCN | 60 | 1900 | 3.0 | Slight |
| 15 | 5Cr$_3$C$_2$ — 0.5Mo — The rest: TiCN | 60 | 1900 | 2.5 | None |
| 16 | 5Cr$_3$C$_2$ — 1.0Mo — The rest: TiCN | 65 | 1950 | 2.5 | None |
| 17 | 5Cr$_3$C$_2$ — 2.0Mo — The rest: TiCN | 80 | 1950 | 2.7 | None |
| 18 | 5Cr$_3$C$_2$ — 5.0Mo — The rest: TiCN | 65 | 2000 | 3.0 | None |
| 19 | 5Cr$_3$C$_2$ — 10.0Mo — The rest: TiCN | 65 | 2000 | 2.7 | None |
| 20 | 5Cr$_3$C$_2$ — 0.5Ni — The rest: TiCN | 80 | 1900 | 3.0 | None |
| 21 | 5Cr$_3$C$_2$ — 1.0Ni — The rest: TiCN | 75 | 1850 | 3.0 | None |
| 22 | 5Cr$_3$C$_2$ — 2.0Ni — The rest: TiCN | 60 | 1800 | 3.2 | None |
| 23 | 5Cr$_3$C$_2$ — 5.0Ni — The rest: TiCN | 70 | 1800 | 4.0 | None |
| 24 | 5Cr$_3$C$_2$ — 10.0Ni — The rest: TiCN | 60 | 1600 | 4.2 | Slight |
| 25 | 5Cr$_3$C$_2$ — 0.5Co — The rest: TiCN | 75 | 1900 | 2.7 | None |
| 26 | 5Cr$_3$C$_2$ — 1.0Co — The rest: TiCN | 75 | 1950 | 3.0 | None |
| 27 | 5Cr$_3$C$_2$ — 2.0Co — The rest: TiCN | 75 | 1900 | 3.0 | None |
| 28 | 5Cr$_3$C$_2$ — 5.0Co — The rest: TiCN | 80 | 1900 | 3.5 | None |
| 29 | 5Cr$_3$C$_2$ — 10.0Co — The rest: TiCN | 90 | 1700 | 4.0 | None |
| 30 | 5Cr$_3$C$_2$ — 0.5Si — The rest: TiCN | 95 | 1800 | 3.0 | None |
| 31 | 5Cr$_3$C$_2$ — 1.0Si — The rest: TiCN | 80 | 1800 | 3.3 | None |
| 32 | 5Cr$_3$C$_2$ — 2.0Si — The rest: TiCN | 80 | 1800 | 3.3 | None |
| 33 | 5Cr$_3$C$_2$ — 5.0Si — The rest: TiCN | 65 | 1600 | 4.0 | None |
| 34* | 20Cr$_3$C$_2$ — The rest: TiCN | 60 | 1800 | 2.4 | Some |
| 35 | 20Cr$_3$C$_2$ — 0.5Ti — The rest: TiCN | 65 | 1800 | 3.0 | None |
| 36 | 20Cr$_3$C$_2$ — 1.0Ti — The rest: TiCN | 60 | 1800 | 3.0 | None |
| 37 | 20Cr$_3$C$_2$ — 2.0Ti — The rest: TiCN | 60 | 1900 | 3.5 | None |
| 38 | 20Cr$_3$C$_2$ — 0.5Zr — The rest: TiCN | 65 | 1950 | 4.0 | None |
| 39 | 20Cr$_3$C$_2$ — 1.0Zr — The rest: TiCN | 60 | 1900 | 3.0 | None |
| 40 | 20Cr$_3$C$_2$ — 2.0Zr — The rest: TiCN | 60 | 1900 | 4.0 | None |
| 41 | 20Cr$_3$C$_2$ — 0.5Cr — The rest: TiCN | 90 | 1950 | 4.0 | None |

TABLE 1-continued

| Specimen No. | Chemical Composition (% by weight) | *1 | *2 | *3 | Porosity |
|---|---|---|---|---|---|
| 42 | $20Cr_3C_2$ — 1.0Cr — The rest: TiCN | 85 | 1900 | 4.5 | None |
| 43 | $20Cr_3C_2$ — 2.0Cr — The rest: TiCN | 60 | 1800 | 3.5 | None |
| 44 | $20Cr_3C_2$ — 0.5Mo — The rest: TiCN | 60 | 1900 | 4.0 | None |
| 45 | $20Cr_3C_2$ — 1.0Mo — The rest: TiCN | 60 | 1900 | 3.0 | None |
| 46 | $20Cr_3C_2$ — 2.0Mo — The rest: TiCN | 70 | 1900 | 3.5 | None |
| 47 | $20Cr_3C_2$ — 0.5Ni — The rest: TiCN | 75 | 1850 | 4.5 | None |
| 48 | $20Cr_3C_2$ — 1.0Ni — The rest: TiCN | 75 | 1850 | 4.5 | None |
| 49 | $20Cr_3C_2$ — 2.0Ni — The rest: TiCN | 65 | 1950 | 3.2 | None |
| 50 | $20Cr_3C_2$ — 0.5Co — The rest: TiCN | 65 | 1850 | 3.6 | None |
| 51 | $20Cr_3C_2$ — 1.0Co — The rest: TiCN | 60 | 1900 | 3.8 | None |
| 52 | $20Cr_3C_2$ — 2.0Co — The rest: TiCN | 60 | 1900 | 3.0 | None |
| 53 | $20Cr_3C_2$ — 0.5Si — The rest: TiCN | 60 | 1900 | 3.0 | None |
| 54 | $20Cr_3C_2$ — 1.0Si — The rest: TiCN | 65 | 1850 | 3.5 | None |
| 55 | $20Cr_3C_2$ — 2.0Si — The rest: TiCN | 65 | 1800 | 3.0 | None |
|  | $20Cr_3C_2$ — 20Ni — The rest: TiCN | 105 | 1400 | 9.7 | None |
|  | $20Cr_3C_2$ — 30Ni — The rest: TiCN | 130 | 1200 | 9.5 | None |
| 56 | $5Cr_3C_2$ — 0.05Cr — The rest: TiCN | 70 | 1800 | 2.6 | None |
| 57 | $5Cr_3C_2$ — 0.05Ni — The rest: TiCN | 65 | 1850 | 2.7 | None |
| 58 | $5Cr_3C_2$ — 0.05Si — The rest: TiCN | 75 | 1800 | 2.7 | None |
| 59 | $5Cr_3C_2$ — 0.05Zr — The rest: TiCN | 55 | 1850 | 2.5 | None |

*1: Deffective Strength (kg/mm$^2$)
*2: Vickers Hardness (kg/mm$^2$)
*3: Fracture Toughness (MPa m$^{\frac{1}{2}}$)

TABLE 2

| Specimen | Chemical Composition (% by weight) | *1 | *2 | *3 | Porosity |
|---|---|---|---|---|---|
| 1 | $20Cr_3C_2$—20Ni — The rest: TiCN | 105 | 1400 | 9.7 | None |
| 2 | $20Cr_3C_2$—30Ni — The rest: TiCN | 130 | 1200 | 9.5 | None |
| 3 | $20Cr_3C_2$—40Ni — The rest: TiCN | 120 | 1000 | 10.1 | None |
| 4 | $20Cr_3C_2$—20Ni — $0.1B_4C$ — The rest: TiCN | 110 | 1400 | 9.9 | None |
| 5 | $20Cr_3C_2$—20Ni — $0.4B_4C$ — The rest: TiCN | 110 | 1450 | 9.7 | None |
| 6 | $20Cr_3C_2$—20Ni — $0.8B_4C$ — The rest: TiCN | 120 | 1450 | 10.8 | None |

*1: Deffective Strength (kg/mm$^2$)
*2: Vickers Hardness (kg/mm$^2$)
*3: Fracture Toughness (MPa m$^{\frac{1}{2}}$)

What is claimed is:

1. A titanium carbo-nitride and chromium carbide-based ceramic containing metals prepared by sintering a powder mixture obtained by adding 0.05 to 40 percent by weight of one or more elements selected from the group consisting of titanium, zirconium, hafnium, vanadium, niobium, tantalum, chromium, molybdenum, tungsten, manganese, iron, cobalt, nickel, and silicon to a basic component that consists of titanium carbo-nitride containing different ratios of carbon and nitrogen and 1 to 30 percent by weight of chromium carbide.

2. A titanium carbide-nitride and chromium carbide-based ceramic containing metals prepared by sintering a powder mixture prepared by adding to 0.1 to 5 percent by weight of boron carbide to a basic component that consists of titanium carbo-nitride containing different ratios of carbon and nitride, 1 to 30 percent by weight of chromium carbide, 0.05 to 40 percent by weight of one or more elements selected from the group consisting of titanium, zirconium, hafnium, vanadium, niobium, tantalum, chromium, molybdenum, tungten, manganese, iron, cobalt, nickel, and silicon.

3. A titanium carbo-nitride and chromium carbide-based ceramic according to claim 1 or 2, in which the titanium carbo-nitride contains carbon and nitrogen by a ratio of between 10:90 and 90:10.

4. A titanium carbo-nitride and chromium carbide-based ceramic according to claim 1 or 2, in which the powder of titanium carbo-nitride consists of grains averaging 2 μm and under in size.

5. A titanium carbo-nitride and chromium carbide-based ceramic according to claim 1 or 2, in which the chromium carbide consists of one or more compounds selected from the group consisting of $Cr_3C_2$, $Cr_{23}C_6$ and $Cr_7C_3$ and having a mean grain size of 2 μm.

6. The titanium carbo-nitride and chromium carbide-based ceramic of claim 4, wherein said grains average 1 μm and under in size.

7. The titanium carbo-nitride and chromium carbide-based ceramic of claim 5, wherein said mean grain size have an average grain size of 1 μm and under.

* * * * *